United States Patent
Keil et al.

(10) Patent No.: US 10,778,459 B2
(45) Date of Patent: Sep. 15, 2020

(54) METHOD AND SYSTEM FOR GENERATING SECURITY NOTIFICATIONS TO A USER'S CONTACTS REGARDING THE USER OF AN APPLICATION

(71) Applicant: Life360, Inc., San Francisco, CA (US)

(72) Inventors: Dylan Keil, Menlo Park, CA (US); Alexander Haro, Las Vegas, NV (US)

(73) Assignee: Life360, Inc., San Francisco, CA (US)

( * ) Notice: Subject to any disclaimer, the term of this patent is extended or adjusted under 35 U.S.C. 154(b) by 283 days.

(21) Appl. No.: 15/653,222

(22) Filed: Jul. 18, 2017

(65) Prior Publication Data

US 2019/0028288 A1     Jan. 24, 2019

(51) Int. Cl.
| | | |
|---|---|---|
| H04L 12/18 | (2006.01) | |
| G06Q 50/26 | (2012.01) | |
| H04L 29/08 | (2006.01) | |
| H04L 12/58 | (2006.01) | |
| G06Q 10/10 | (2012.01) | |

(52) U.S. Cl.
CPC ....... *H04L 12/1895* (2013.01); *G06Q 50/265* (2013.01); *H04L 51/20* (2013.01); *H04L 67/20* (2013.01); *H04L 67/26* (2013.01); *G06Q 10/10* (2013.01); *H04L 67/306* (2013.01)

(58) Field of Classification Search
CPC ... H04L 12/1895; H04L 67/26; H04L 67/306; H04L 51/20; H04L 67/20; G06Q 50/265; G06Q 10/10; G06Q 50/14; G06Q 50/30; G06F 17/30867; G06F 16/9535; H04M 1/72572; H04M 3/42348; H04W 8/22; H04W 4/021
See application file for complete search history.

(56) References Cited

U.S. PATENT DOCUMENTS

| | | | |
|---|---|---|---|
| 7,400,245 B1 | 7/2008 | Johnson | |
| 9,277,389 B2 | 3/2016 | Saito et al. | |
| 9,497,585 B1 * | 11/2016 | Cooley | H04L 67/22 |
| 9,503,873 B1 | 11/2016 | Yadav | |
| 9,549,305 B2 | 1/2017 | Grube et al. | |
| 2011/0034147 A1 * | 2/2011 | Issa | H04M 1/72572 |
| | | | 455/410 |
| 2013/0040661 A1 * | 2/2013 | Grube | H04W 8/22 |
| | | | 455/456.3 |
| 2016/0035204 A1 | 2/2016 | Jansen | |
| 2016/0091474 A1 * | 3/2016 | Griffon | G01N 33/0036 |
| | | | 702/24 |
| 2017/0345112 A1 * | 11/2017 | Locke | G06Q 50/14 |
| 2018/0189913 A1 * | 7/2018 | Knopp | H04W 4/90 |

* cited by examiner

*Primary Examiner* — Muhammad Raza
(74) *Attorney, Agent, or Firm* — Womble Bond Dickinson (US) LLP

(57) ABSTRACT

Method for generating security notifications regarding user of application executing on user's mobile device starts with a server receiving location data from user's mobile device and historic information related to the location data from historic database. Historic information may include historical safety rating, crime related data, sex offender data. Server generates current safety rating of location data based on historic information. Server generates and transmits notification to at least one mobile device of at least one contact associated with user when current safety rating indicates that location data is associated with a potential threat. Notification includes an alert message to be displayed on the at least one mobile device of the at least one contact. Other embodiments are disclosed.

12 Claims, 3 Drawing Sheets

US 10,778,459 B2

METHOD AND SYSTEM FOR GENERATING SECURITY NOTIFICATIONS TO A USER'S CONTACTS REGARDING THE USER OF AN APPLICATION

FIELD

The invention relates to system and method for generating security notifications to a user's contacts regarding the user of an application.

BACKGROUND

Often, an individual will be in a dangerous situation and will not have any means by which to alert others of the danger to that person's self. Examples of these situations may include walking in a dangerous neighborhood at night alone, driving in a deserted area, or even being located in a normally safe location with unusual safety concerns (e.g. extreme weather conditions such as a hurricane, a wild fire, or an earthquake). There may be situations in which the person might not be able to make a phone call due to benign circumstances (e.g. intermittent network access) or dangerous circumstances (e.g. a criminal is stalking the person on the street). In these situations, an individual in danger may not have access to help or emergency responders.

In other situations, while an individual may accurately determine his location using his mobile device, he may not be aware of potentially dangerous situations (e.g., travelling through a high crime area). When the individual is a child in this dangerous situation, that child would not be aware that he should contact a parent or emergency contact for help.

BRIEF DESCRIPTION OF DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," "engine" and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

In general, embodiments of the invention provide a system and method for generating security notifications regarding a user of an application executing on the user's mobile device.

Figure 1:
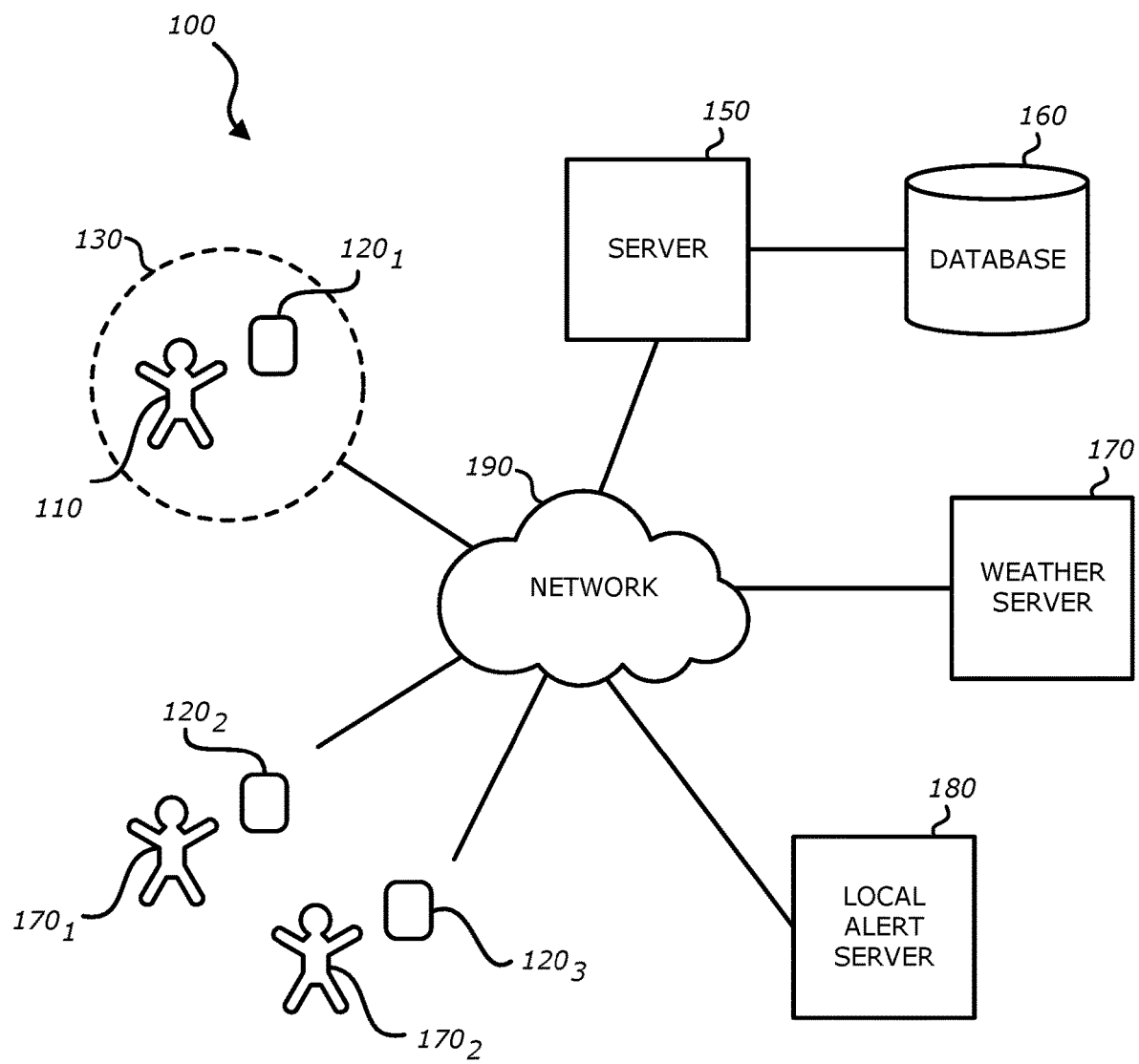
FIG. 1 shows an exemplary block representation of a system for generating security notifications to a user's contacts regarding the user of an application in accordance with one embodiment of the invention.

FIG. 1 shows an exemplary block representation of a system 100 for generating security notifications to a user's contacts regarding the user of an application in accordance with one embodiment of the invention. In FIG. 1, the system 100 includes a user 110 (or tracked individual) associated with a mobile communication device 120, and a plurality of users $170_1$-$170_2$ respectively associated with mobile communication devices $120_2$-$120_3$. While only two users $170_1$, $170_2$ with two mobile devices $120_2$, $120_3$ are illustrated in FIG. 1, it is understood that more than two users $170_i$ with mobile devices $120_i$ (i>2) may be included in the system 100. At least one of the users $170_1$, $170_2$ may be a contact user that is pre-established as an emergency contact for the user 110. For example, the contact user may be a parent of the user 110. The mobile communication devices $120_1$-$120_3$ may be in the form of a computer, a handheld portable electronic device such as a cellular phone, a mobile device, a personal data organizer, a computing device having a tablet-style form factor, etc. These types of electronic devices, as well as other electronic devices providing comparable voice communications capabilities (e.g., VoIP, telephone communications, etc.) and/or location and movement tracking capabilities, may be used in conjunction with the present techniques. In some embodiments, a mobile communication devices $120_1$-$120_3$ may be in the form of a wearable device (smartwatch) or a vehicle. In some embodiments, the contact users $170_2$, $170_3$'s devices $120_2$-$120_3$ may be stationary electronic devices such as a desktop computer. Accordingly, the mobile devices $120_1$-$120_3$ include hardware such as a processor(s), memory, sensors (GPS, gyroscope, accelerometer, compass, barometer etc.) and connectivity hardware (3G/LTE Modem, Wi-Fi, Bluetooth, NFC (Near Field Connectivity) etc.).

As shown in FIG. 1, the mobile devices $120_1$-$120_3$ are coupled via a network 190 to a server 150. The network 190 may be a cellular mobile phone network (e.g. a Global System for Mobile communications, GSM, network), including current 2G, 3G, 4G, 5G, LTE networks and their associated call and data protocols; and an IEEE 802.11 data network (WiFi or Wireless Local Area Network, WLAN). The network 190 may also include Ethernet connections.

Figure 3:
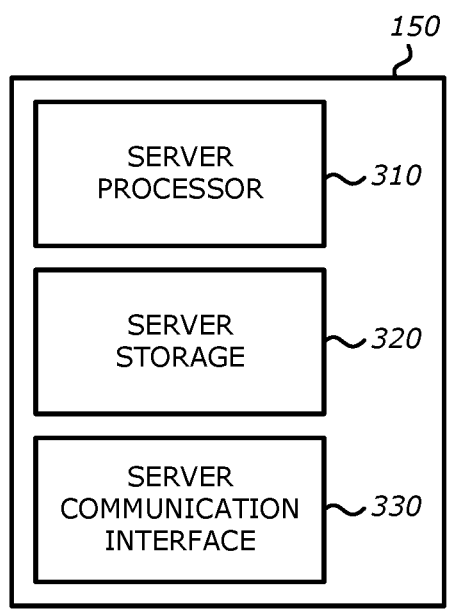
FIG. 3 shows an exemplary block representation of the server 150 in the system in FIG. 1 in which an embodiment of the invention may be implemented.

Referring to FIG. 3, an exemplary block representation of the server 150 in the system in FIG. 1 in which an embodiment of the invention may be implemented is illustrated. The server 150 includes a server processor 310, a server storage 320, a server communication interface 330.

The processor 310 may be a microprocessor, a microcontroller, a cell processor, or a central processing unit. The term "processor" may refer to a device having two or more processing units or elements, e.g. a CPU with multiple processing cores. The processor 310 may be used to control the operations of the server 150. In one embodiment, the processor 310 is also coupled to the server storage 320 that may include one or more different types of storage such as hard disk drive storage, nonvolatile memory, and volatile memory such as dynamic random access memory. By executing software instructions or code stored in the server storage 320, the processor 310 may cause the server 150 to perform a method of generating security notifications regarding a user of an application executing on the user's mobile device. In some cases, a particular function may be implemented as two or more pieces of software that are being executed by different hardware units of a processor.

In some embodiments, the server storage 320 may also store information pertaining to the user 110. The server 150 may establish various policies for each user being tracked, location detection algorithms to be used, as well as the contact information of the contact users for each user being tracked. For example, the contact users $170_1$, $170_2$ may be the parents of user 110. Thus, when setting up the tracking of the user 110, the server 150 may store in the server storage 320 the telephone numbers of the contact users $170_1$, $170_2$'s mobile devices $120_2$, $120_3$ in association with the user 110. In this embodiment, the contact users $170_1$, $170_2$ are included in a pre-assigned group of contacts for user 110.

In one embodiment, the server 150 may also store, in server storage 320, the policies for each user being tracked. For example, it may be established that the contacts $170_1$, $170_2$ are to be contacted if the current security rating generated by the server 150 falls below a predetermined threshold. This predetermined threshold may be set by the user 110 or the contact users $170_1$, $170_2$ and stored in the server storage 320 in association with the user 110. In other embodiments, the policies stored in the server storage 320 may further include a maximum speed for the user 110 before the current security rating should indicate a potential threat, a time of day the user 110 should not be in given locations such that the current security rating would indicate a potential threat, etc. The policies for user 110 may be established based on user preferences.

The communication interface 330 is be a network communication interface that may include a wired network interface such as an IEEE 802.3 Ethernet interface as well as a wireless interface such as an IEEE 802.11 WiFi interface. Data may also be received from any one of a variety of different wireless communications networks and in accordance with any one of several different protocols. These include: a cellular mobile phone network (e.g. a Global System for Mobile communications, GSM, network), including current 2G, 3G, 4G, 5G, and LTE networks; and an IEEE 802.11 network (WiFi or Wireless Local Area Network, WLAN). In one embodiment, the server 150 may communicate, for example, with the mobile devices $120_1$-$120_3$, the weather server 170 and the local alert server 180 via the communication interface 330.

Though in FIG. 1, a single server 150 is shown, it is understood that the server 150 may be a virtual machine, with all the above capabilities, distributed over multiple servers or the cloud computing.

In one embodiment, the server 150 receives location data from the user 110's mobile device $120^1$. The location data may include the location of the user. Specifically, the server 150 may request the location data from the mobile device $120_1$ which may extract the location data upon receiving the request from the server 150 by using internal sensors and radios and by connecting to the Global Positioning System (GPS). The mobile device $120_1$ may also extract its location data by using internal sensors and radios and by triangulation using the Wireless (WiFi) towers and/or WiFi base stations. The location data from mobile device $120_1$ is generated and transmitted to the server 150 over the network 190. The location data may not be accurate but rather it may be within an error radius 130 due to the location fixing accuracy of the mobile device $120_1$'s sensor or due to reflections from the mobile device $120_1$'s surroundings. In some embodiments, the location data from the mobile device $120_1$ is further refined using, for example, proximity information to other mobile devices $120_1$ or using historical data associated with the user of the mobile device $120_1$. In one embodiment, the server 150 may determine the location of the user 110 using the location data or using the GPS or WiFi towers or base stations and continuously updates the location data (or location of the user $110_1$) and the direction of movement of the user 110.

As shown in FIG. 1, the server 150 is coupled to a historic database 160. While the historic database 160 is shown as separate from the server 150, in some embodiments, the memory storage 320 of the server 150 may include a historic database 160 that stores the historic data of a plurality of locations. The server 150 may request (or query) and receive from the historic database 160 historic information related to the location data. The historic information related to the location data includes at least one of: historical safety rating of the location data, crime related data associated with the location data, or sex offender data associated with the location data. The historic database 160 may also store saved incidents (e.g., attacks, robbery, etc.) that have occurred in various locations and data related to other tracked users (e.g., safety ratings previously generated for each location). In this embodiment, the crime related data associated with the location data may include these saved incidents. In one embodiment, the historic safety rating of the location data is further computed based on the saved incidents. Historic information from the historic database 160 provides insight on whether the current location of the user 110 or the region in which the user 110 is travelling is a high crime area or may be potentially dangerous. In one embodiment, the historic database 160 may also store historical qualitative user assessment of the location. For instance, a user of the system 100 may have previously dismissed a safety alert for that location. This dismissal of a safety alert would be stored in the historic database 160 to indicate that the location safety risk is lower. In this embodiment, the historical safety rating may be further computed using the historical qualitative user assessment that is stored in the historic database 160.

Using this historic information, the server 150 may generate a current safety rating of the location data. The current safety rating is a security rating of the current location of the user 110. In one embodiment, the current safety rating may also be a security rating of the location or region through which the user 110 is traveling. In this embodiment, the server 150 generates the current safety rating based on a probabilistic estimation of movement of the user $110_1$ to analyze whether the user 110 is in dangerous surroundings or in a dangerous situation.

In one embodiment, the server 150 may also receive motion data from the user's mobile device $120_1$ and generate the current safety rating of the location data further based on the motion data. For example, the mobile device $120_1$, using motions sensors such as an accelerometer, gyroscope, or an inertial sensor included therein, may generate the motion data associated with the mobile device $120_1$. The motion data may indicate for example that the user 110 is driving at an excessive speed. In this embodiment, the server 150 may decrease the current safety rating of the location data based on this motion data indicating an unsafe driving speed.

In another embodiment, the server 150 may receive a time data from the user's mobile device 120₁. The time data indicates the time at which the location data is being reported to the server 150. The server 150 may further generate the current safety rating of the location data is further based on the time data. For instance, if the time data indicates that it is late in the evening, the server 150 may decrease the current safety rating to show a decreased level of safety for the user 110.

Referring back to FIG. 1, a weather server 170 and a local alert server 180 may also be included in system 300. The server 150 may receive, from a weather server 170, current weather information related to the location data. The weather server 170 may be updated using data from Federal or State governmental agencies (e.g., Federal Emergency Management Agency (FEMA)) or may include weather related data from general weather websites or applications. The current weather information provided by the weather server 170 may include, for example, weather warnings (e.g., tsunamis, earthquake, tornados) and evacuation emergencies (e.g., fire evacuations). In this embodiment, the server 150 may generate the current safety rating of the location data based on the current weather information. For instance, the information received for user 110's location from the weather server 170 may be used to determine whether the user 110 is in immediate danger (e.g., user 110 is travelling in the path of a tornado, user 110 is at a beach and there is a tsunami warning, or user 110 is in a location that requires immediate evacuation due to floods or fire).

As shown in FIG. 1, the server 150 may receive, from a local alert server 180, current alert information related to the location data. The local alert server 180 may include data from local agencies such as law enforcement agencies and fire departments. For example, the current alert information may include: acts of terror, neighborhood or road closures, police activity, localized flooding, and gas leaks. In this embodiment, the server 150 may generate the current safety rating of the location data based on the current alert information (e.g., user 110 is in a neighborhood where there is a police activity, user 110 is a student who is at school during an emergency lockdown of the school, or user 110 is driving on a road that is closed due to a hazardous situation such as a fire, or a chemical spill, etc.).

In one embodiment, the server 150 performs a probabilistic analysis to generate the current safety rating which establishes whether the user 110 is in danger. Once the current safety rating is generated, the server 150 may also update the historical database 160 with the current safety rating of the location data.

When the current safety rating indicates that the location data is associated with a potential threat, the server 150 may generate and transmit a notification via the communication interface 330 to a mobile device 170₂ and/or 170₃ of an emergency contact associated with the user. As discussed above, the emergency contact associated with the user is pre-established and stored in the server storage 320. In some embodiments, the notification includes an alert message to be displayed on an emergency contact user's mobile device 170₂, 170₃. The alert message may include, for example, identification of the user, the location data, the historic information related to the location data, or a time data. The alert message may be, for example, a text message, a phone call, a voicemail, a push notification, a message via a third-party application, or an email. In some embodiments, the server 150 may also generate and transmit a notification to an emergency agency.

The embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 2:
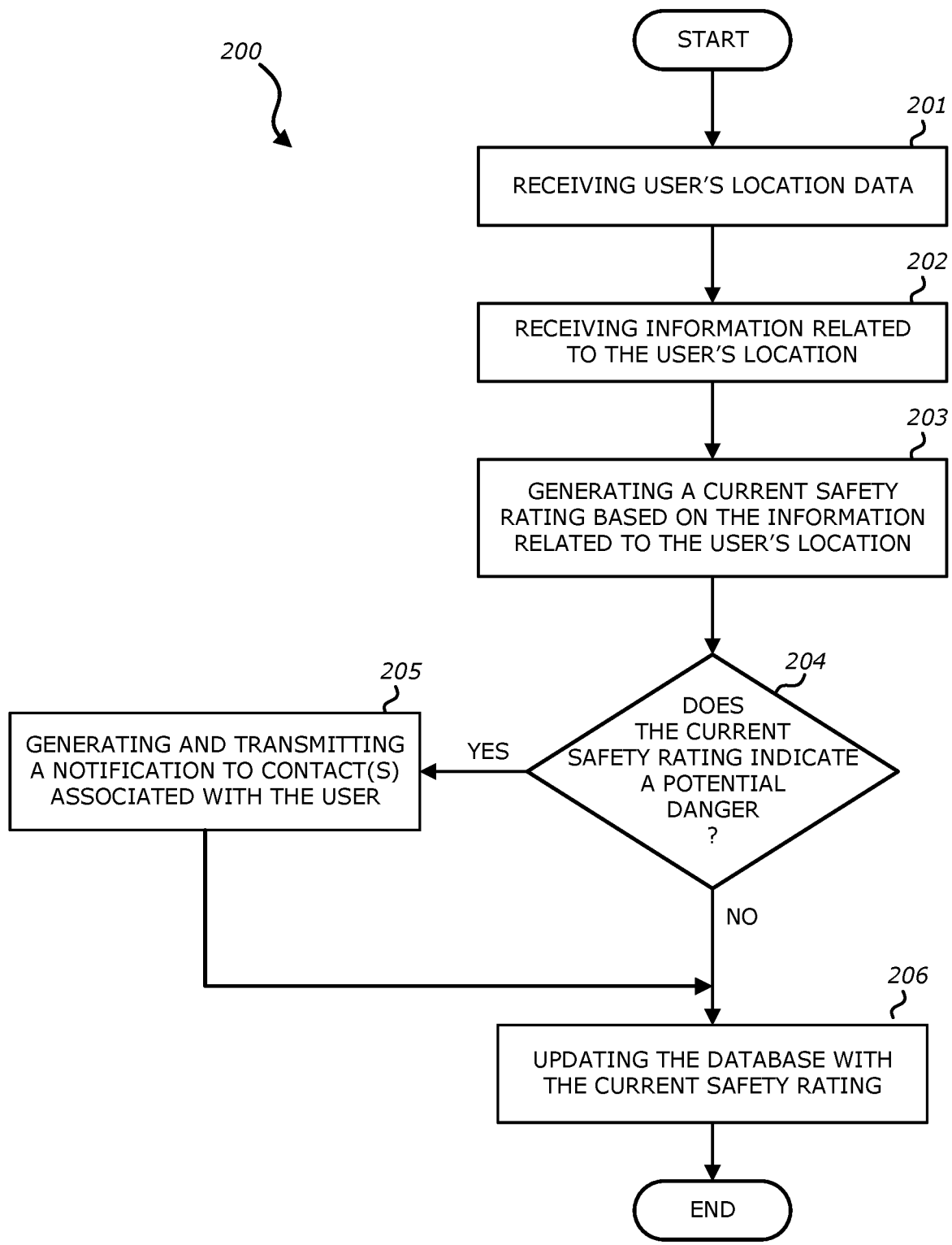
FIG. 2 shows an exemplary flowchart of a method for generating security notifications to a user's contacts regarding the user of an application with one embodiment of the invention.

FIG. 2 shows an exemplary flowchart of a method 200 for generating security notifications to a user's contacts regarding the user of an application with one embodiment of the invention.

The method 200 starts with the server processor 310 receiving a user's location data from the user 110's mobile device 120₁ via the server communication interface 330 at Block 201. This location data may be provide the location of the user's mobile device 120₁ or data from which the server processor 310 can compute location of the user's mobile device 120₁.

At Block 202, the server processor 310 receives information related to the user 110's location (or location data) via the server communication interface 330. The information may include historic information related to the location data that is received from the historic database 160. The historic information related to the location data may include, for example, historical safety rating of the location data, crime related data associated with the location data, or sex offender data associated with the location data. The information may also include, for example, current weather information related to the location data from the weather server 170 and current alert information related to the location data from the local alert server 180. In other embodiments, information related to the user's location or location data may also include motion data and the time data that is received from the user 110's mobile device 120₁.

At Block 203, the server processor 310 generates a current safety rating of the location data based on the information related to the user 110's location (or location data). The current safety rating may be generated using a probabilistic analysis based on the information related to the location data as well as policies and user preferences stored in the server storage 320.

At Block 204, the server processor 310 determines whether the current safety rating indicates a potential danger to user 110. If the current safety rating indicates a potential danger at Block 204, the server processor 310 generates and transmits a notification to at least one contact 170₁, 170₂ associated with the user 110 (e.g., emergency contacts that have been pre-established and stored in the server storage 320). The notification may include an alert message to be displayed on the at least one mobile device 120₂, 120₃ of the at least one contact 170₁, 170₂.

Once the notification is sent in Block 205 or if the current safety rating does not indicate a potential danger in Block 204, the server processor 310 updates the database 160 with the current safety rating for the location data at Block 206.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method for generating security notifications regarding a potential threat to physical safety of a user based on an application executing on the user's mobile device comprising:
   continuously receiving, by a processor included in a server, location data from the user's mobile device;
   receiving, by the processor, from a historic database, historic information related to the continuously received location data, wherein the historic information related to the continuously received location data includes at least one of: historical safety rating of the continuously received location data, crime related data associated with the continuously received location data, or sex offender data associated with the continuously received location data;
   receiving, by the processor, motion data and time data from the user's mobile device;
   receiving, by the processor, current weather information related to the location data from a weather server;
   receiving, by the processor, current alert information related to the location data from a local alert server;
   generating, by the processor, a current safety rating of the continuously received location data based at least on the historic information, the motion data, the time data, and at least one of: the current weather information related to the location data or the current alert information related to the location data;
   determining, by the processor, whether the current safety rating of the continuously received location data indicates a potential danger to the user's physical safety;
   generating and transmitting, by the processor, a notification to at least one mobile device of at least one contact associated with the user if the current safety rating indicates that the continuously received location data is associated with the potential danger to the user's physical safety, wherein the notification includes an alert message to be displayed on the at least one mobile device of the at least one contact;
   continuously updating, by the processor, the historical database with the current safety rating of the continuously received location data if the current safety rating does not indicate that the continuously received location data is associated with the potential danger to the user's physical safety; and
   establishing, by the processor, policies for the user, the policies including a maximum speed for the user before the current safety rating indicates the potential danger to the user's physical safety.

2. The method of claim 1,
   wherein the current weather information includes at least one of: weather warnings or evacuation emergencies, and
   wherein the current alert information includes at least one of: acts of terror, neighborhood or road closures, police activity, localized flooding, or gas leaks.

3. The method of claim 1, wherein the alert message includes at least one of: identification of the user, the location data, the historic information related to the location data, or a time data.

4. The method of claim 1, further comprising:
   generating and transmitting, by the processor, a notification to an emergency agency.

5. The method of claim 1, wherein the alert message is at least one of: a text message, a phone call, a voicemail, a push notification, a message via a third-party application, or an email.

6. A non-transitory computer-readable storage medium having stored thereon instructions which when executed by a processor causes the processor to perform a method for generating security notifications regarding a potential threat to physical safety of a user based on an application executing on the user's mobile device, the method comprising:
   continuously receiving location data from the user's mobile device;
   receiving from a historic database, historic information related to the continuously received location data, wherein the historic information related to the continuously received location data includes at least one of: historical safety rating of the continuously received location data, crime related data associated with the continuously received location data, or sex offender data associated with the continuously received location data;
   receiving motion data and time data from the user's mobile device;
   receiving, from a weather server, current weather information related to the location data;
   receiving, from a local alert server, current alert information related to the location data;
   generating a current safety rating of the continuously received location data based at least on the historic information, the motion data, the time data, and at least one of: the current weather information related to the location data or the current alert information related to the location data;
   determining whether the current safety rating of the continuously received location data indicates a potential danger to the user's physical safety;
   generating and transmitting a notification to at least one mobile device of at least one contact associated with the user if the current safety rating indicates that the continuously received location data is associated with the potential danger to the user's physical safety, wherein the notification includes an alert message to be displayed on the at least one mobile device of the at least one contact; and
   continuously updating the historical database with the current safety rating of the continuously received location data if the current safety rating does not indicate that the continuously received location data is associated with the potential danger to the user's physical safety; and establishing policies for the user, the policies including a maximum speed for the user before the current safety rating indicates the potential danger to the user's physical safety.

7. The computer-readable storage medium of claim 6, wherein the current weather information includes at least one of: weather warnings or evacuation emergencies, and wherein the current alert information includes at least one of: acts of terror, neighborhood or road closures, police activity, localized flooding, or gas leaks.

8. The computer-readable storage medium of claim 6, wherein the alert message includes at least one of: identification of the user, the location data, the historic information related to the location data, or a time data.

9. The computer-readable storage medium of claim 6, having stored thereon instructions which when executed by the processor causes the processor to perform a method further comprising:

generating and transmitting a notification to an emergency agency.

10. The computer-readable storage medium of claim 6, wherein the alert message is at least one of: a text message, a phone call, a voicemail, a push notification, a message via a third-party application, or an email.

11. A system for generating security notifications regarding a user of an application executing on the user's mobile device, comprising:

a historic database to store historic information associated with a plurality of locations including a location associated with location data associated with the user, wherein the historic information with a plurality of locations includes at least one of: historical safety rating, crime related data, or sex offender data; and a server including a processor, the server to:

continuously receive the location data from the user's mobile device;

receive the historic information associated with the continuously received location data from the historic database, receive motion data and time data from the user's mobile device, receive, from a weather server, current weather information related to the location data, receive, from a local alert server, current alert information related to the location data, generate a current safety rating of the continuously received location data based at least on the historic information associated with the continuously received location data, the motion data, the time data, and at least one of: the current weather information related to the location data or the current alert information related to the location data, determine whether the current safety rating of the continuously received location data indicates a potential danger to the user's physical safety, generate and transmit a notification to at least one mobile device of at least one contact associated with the user when the current safety rating indicates that the continuously received location data is associated with a potential danger to the user's physical safety, wherein the notification includes an alert message to be displayed on the at least one mobile device of the at least one contact, continuously update the historical database with the current safety rating of the continuously received location data when the current safety rating does not indicate that the continuously received location data is associated with the potential danger to the user's physical safety, and establish policies for the user, the policies including a maximum speed for the user before the current safety rating indicates the potential danger to the user's physical safety.

12. The system of claim 11, wherein the current weather information includes at least one of: weather warnings or evacuation emergencies, and the current alert information includes at least one of: acts of terror, neighborhood or road closures, police activity, localized flooding, or gas leaks.

\* \* \* \* \*